US008792575B2

(12) United States Patent
Liu et al.

(10) Patent No.: US 8,792,575 B2
(45) Date of Patent: Jul. 29, 2014

(54) POWER SAVING APPARATUS AND METHOD OF MULTIPLE-ANTENNA RECEIVER WITH VARIABLE RATE

(75) Inventors: Der-Zheng Liu, Hsinchu County (TW); Jiun-Hung Yu, Nantou County (TW); Kuang-Yu Yen, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 914 days.

(21) Appl. No.: 12/555,949

(22) Filed: Sep. 9, 2009

(65) Prior Publication Data

US 2010/0061489 A1     Mar. 11, 2010

(30) Foreign Application Priority Data

Sep. 9, 2008   (TW) ................. 97134508 A

(51) Int. Cl.
    *H04B 7/02*      (2006.01)
    *H04L 1/02*      (2006.01)

(52) U.S. Cl.
    USPC .......................................... 375/267; 375/272

(58) Field of Classification Search
    CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
    USPC ........... 375/316, 340, 267, 260, 259; 455/272
    See application file for complete search history.

(56) References Cited

U.S. PATENT DOCUMENTS 5,827,196 A * 10/1998 Yeo et al. ...................... 600/509
2005/0191978 A1* 9/2005 Spencer et al. ............... 455/132

FOREIGN PATENT DOCUMENTS

| CN | 101026433 | 8/2007 |
| CN | 101072217 | 11/2007 |
| CN | 101142760 | 3/2008 |

OTHER PUBLICATIONS

English abstract translation of CN101142760 (published Mar. 12, 2008).
English abstract translation of CN101072217 (published Nov. 14, 2007).
English abstract translation of CN101026433 (published Aug. 29, 2007).
TW Office Action (dated Jun. 29, 2012).

* cited by examiner

*Primary Examiner* — Chieh M Fan
*Assistant Examiner* — Brian J Stevens
(74) *Attorney, Agent, or Firm* — McClure, Qualey & Rodack, LLP

(57) ABSTRACT

A multiple-antenna receiver can enable and disable receive radio frequency front-end and analog front-end circuits of specific antenna receiving routes according to a predetermined scheme during the receive data phase. The predetermined scheme calculates signal quality indices of the receiving route antennas according to a preamble sequence, and derives the modulation and coding scheme and the number of spatial streams via the information provided by a header sequence. Indications of the signal quality indices are compared with threshold values to determine which receiving routes are to be turned on and which receiving routes are to be turned off.

16 Claims, 4 Drawing Sheets

POWER SAVING APPARATUS AND METHOD OF MULTIPLE-ANTENNA RECEIVER WITH VARIABLE RATE

CROSS-REFERENCE TO RELATED APPLICATION

This application claims priority of Taiwanese application no. 097134508, filed on Sep. 9, 2008, the subject matter of which is incorporated herein by reference.

BACKGROUND OF THE INVENTION

1. Field of the Invention

This invention relates to a wireless communication system, more particularly to a MIMO (multiple input multiple output) wireless communication system.

2. Description of the Related Art

The technology of MIMO has been applied to a variety of wireless communication systems recently, including the WLAN (wireless local area network), the WiMAX (Worldwide Interoperability for Microwave Access) and the 4G ($4^{th}$ generation) mobile phone system. These systems have adopted the MIMO to increase transmission speed or channel capacity.

Inevitably, additional antennas and RFE (radio frequency front-end) and AFE (analog front-end) circuits are necessary at the transmitting and receiving ends of the corresponding transmission routes of a MIMO. The hardship of the current application with MIMO is however, to reduce power consumption of the additional components that are present in the corresponding transmission routes.

The general format of each data frame or packet utilized in a wireless system is illustrated in FIG. 1. The format usually includes a preamble sequence used for frame or packet detection, AGC (automatic gain control), carrier synchronization, and timing synchronization. Certain systems have pilot sequences that are placed within the preamble sequence or in between data sequences for adaptive tracking in channel estimation or equalization, and for timing and frequency tracking.

An additional header sequence is usually required in front of the data sequence in cases when the modulation scheme, coding rate, or number of spatial streams is modified for different demands of channel quality and throughput so that the receiver can demodulate and decode the subsequent data sequences correctly. The header sequence is generally encoded with the modulation scheme and coding rate having the lowest level SNR (signal-to-noise ratio) requirements. Hence, the header sequence can be more immune to poor channel responses.

FIG. 2 depicts the conventional multiple-antenna transmitter in block diagram. As illustrated, a multiple-antenna transmitter 200 includes a TX (transmit) frame controller 210, a sequence selection circuit 212, a MIMO modulation and coding circuit 214, and a number of M TX RFE and AFE circuits 216_1~216_M. When the transmitter transmits a data frame or packet, the TX frame controller 210 sends the preamble sequence, the header sequence, and data sequence consecutively to the MIMO modulation and coding circuit 214 via the sequence selection circuit 212 during a certain period of time. The MIMO modulation and coding circuit 214 modulates and encodes the sequences according to a specific modulation scheme, a specific coding rate, and a specific number of spatial streams and then transmits the signals of each transmitting route from the M antennas through the TX RFE and AFE circuits 216_1~216_M, wherein M is an integer greater than or equal to 1.

In order to increase transmission speed or channel capacity in different requirements of channel quality and throughput, the data sequences are modulated and encoded according to various modulation schemes, coding rates, or number of spatial streams such that the signals transmitting via the transmission routes need not be the same all the time. Parameters of the data sequences are placed in the contents of the header sequence to inform the receiver about relevant information for demodulation and decoding. It should be noted that the header sequence is modulated and encoded according to the lowest level SNR requirements to ensure successful demodulation and decoding at the receiving end.

FIG. 3 depicts the conventional multiple-antenna receiver in block diagram. As illustrated, a multiple-antenna receiver 300 includes a RX frame controller 310, a MIMO demodulation and decoding circuit 312, a sequence separation circuit 314, and a number of N RX RFE and AFE circuits 216_1~216_N, wherein N is an integer greater than or equal to 1. The receiver collects signals from N receiving routes that corresponds to N antennas and N RX RFE and AFE circuits 216_1~216_N. A preamble sequence received is processed for frame or packet detection to track the arrival of a data frame or packet. Processes including the AGC, carrier synchronization, timing synchronization, and frame synchronization are then handled when the data frame or packet is detected. The timing of the subsequent sequences is generally confirmed after the frame synchronization process. The RX frame controller 310 demodulates and decodes the header sequence during a corresponding time interval and applies MIMO demodulation and decoding using the lowest level SNR requirements. Information extracted from the header sequence during the time interval determines the schemes for further MIMO demodulation and decoding processes applied to subsequent data sequences.

Nonetheless, increased power consumption may be a problem in multiple-antenna systems because of the multiple transmission routes. The actual power consumption ($P_{RX}$) should be calculated by averaging the transmit power consumption ($P_{TX}$), the receive power consumption ($P_{RX}$), the idle power consumption ($P_{RX\_Idle}$), and the sleep power consumption ($P_{Sleep}$) by weighting them with their respective operating time. The formula of the weighted average is set forth as follows:

$$P_{Avg} = \frac{P_{TX} \cdot T_{TX} + P_{RX} \cdot T_{RX} + P_{RX\_Idle} \cdot T_{RX\_Idle} + P_{Sleep} \cdot T_{Sleep}}{T_{TX} + T_{RX} + T_{RX\_Idle} + T_{Sleep}}$$

Hence, important issues have been raised on topics regarding efficient ways to cut down transmit power consumption, receive power consumption, idle power consumption, and sleep power consumption when the time interval for each operation is preset.

The transmitting and receiving tasks carried out in multiple-antenna systems are usually the most power consuming in various aspects of system application. The required number of transmitting and receiving antennas should be at least the number of spatial streams utilized for transmitting and receiving data signals. Comparatively, it is easier for the transmitter to decide which of the specific antennas are to be used for transmitting data because the transmitting end has full knowledge initially of the spatial streams necessary for data sequence transmission. On the other hand, it is not until the header sequence is demodulated and decoded that the receiver gets an idea of the number of spatial streams that should be used for receiving the data sequences. Hence, the typical approach is to turn on all receiving antennas initially when entering a receive mode and to make use of the spatial diversity gain of multiple antenna systems during the process of packet receiving to enhance receiver efficiency.

Accordingly, the tradeoff between MIMO receiving efficiency and average receiving power consumption is an issue yet to be solved for wireless communication.

SUMMARY OF THE INVENTION

Therefore, one of the objects of the present invention is to provide a method that applies to multiple-antenna receivers and apparatuses to lower average receiving power consumption while maintaining acceptable receiving efficiency.

According to the present invention, a method for receiving a data frame with a multiple-antenna apparatus includes the steps of entering a state for receiving a non-data sequence and turning on a number of N receiving routes to receive the non-data sequence of the data frame, and entering a state for receiving a data sequence and turning on a number of M receiving routes to receive the data sequence of the data frame, in which M is less than N.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
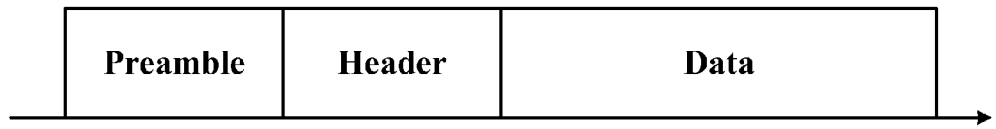
FIG. 1 is a plot illustrating the format of a typical data frame or packet.
Figure 2:
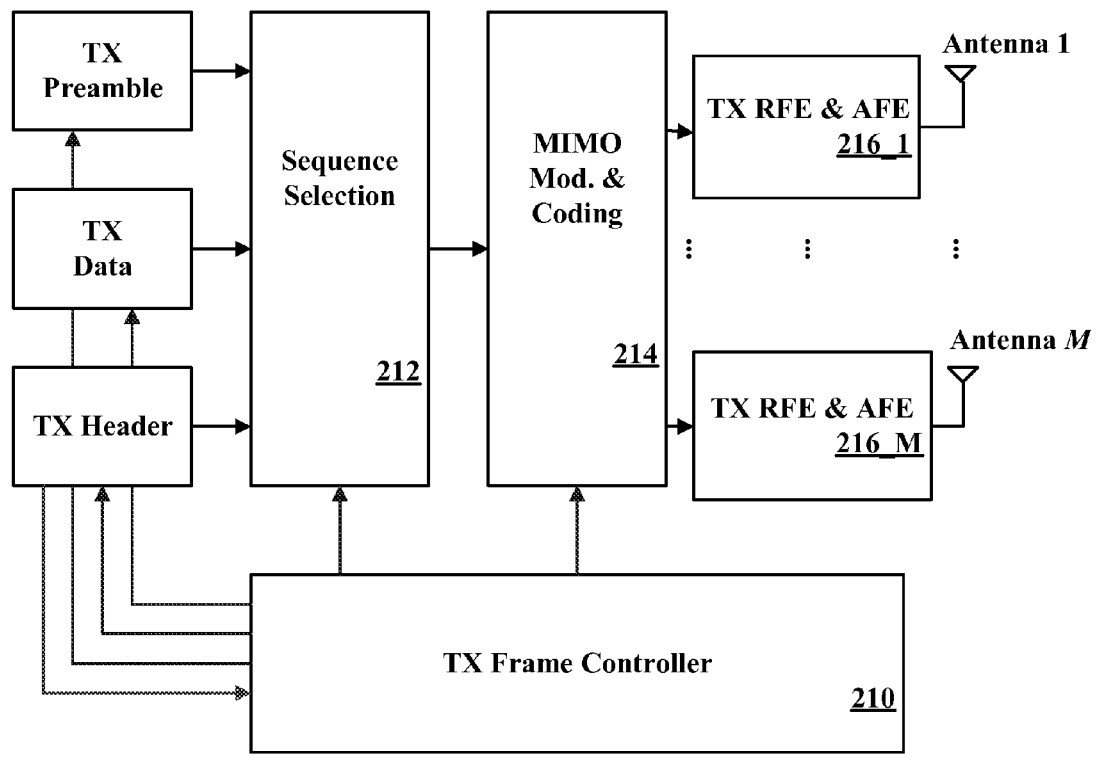
FIG. 2 illustrates a conventional multiple-antenna transmitter in block diagram.
Figure 3:
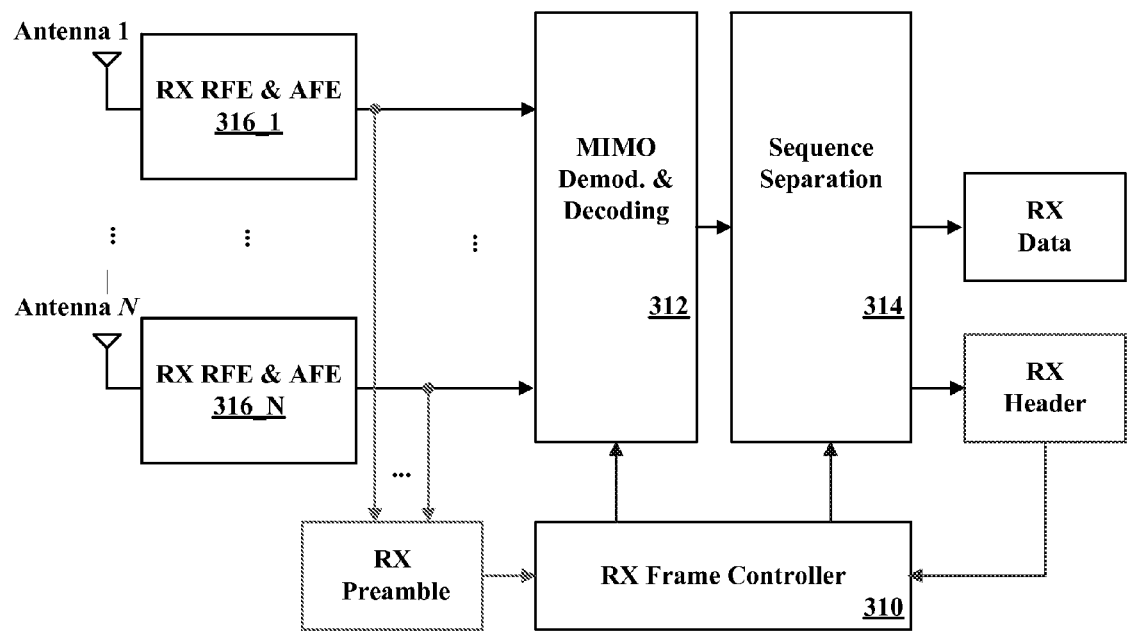
FIG. 3 illustrates a conventional multiple-antenna receiver in block diagram.

Before the present invention is described in greater detail, it should be noted that like elements are denoted by the same reference numerals throughout the disclosure.

Figure 4:
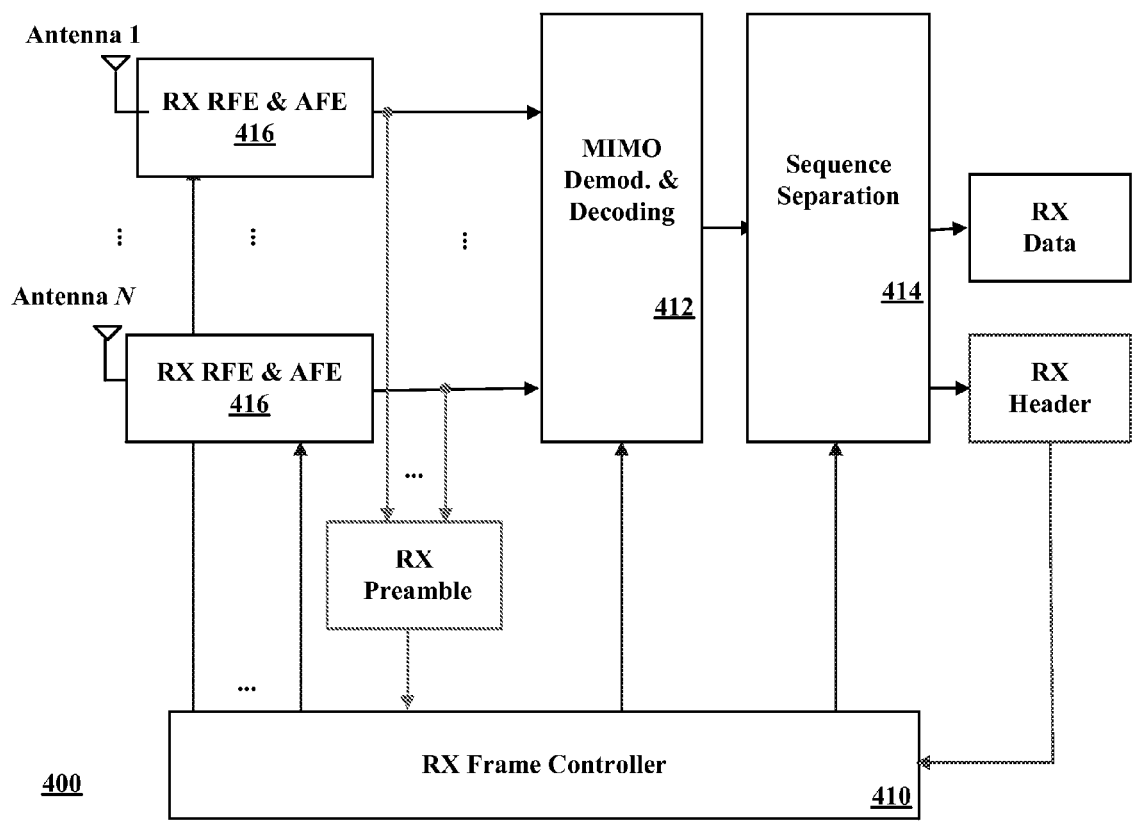
FIG. 4 illustrates a preferred embodiment of a multiple-antenna receiver built according to the present invention in block diagram.

The present invention applies to a multiple-antenna receiver 400 as illustrated in FIG. 4. Referring to FIG. 4, the preferred embodiment of a multiple-antenna receiver 400 includes a RX frame controller 410, a MIMO demodulation and decoding circuit 412, a sequence separation circuit 414, and a number of N RX RFE and AFE circuits 416, i.e. N receiving routes. The RX frame controller 410 in this embodiment can enable and disable the N RX RFE and AFE circuits 416 individually so as to reduce power consumption during a receiving state.

The multiple-antenna receiver 400 starts at an idle state to prepare for packet detection and enters the receiving state when packet arrival is detected. The RX preamble phase, RX header phase, and RX data phase successively progress from the beginning of the receiving state until the packet is fully received, wherein the RX preamble and RX header phases run in a state for receiving non-data sequences.

The average receiving power consumption ($P_{RX}$) is calculated by weighting the power consumption of the RX preamble phase ($P_{RX\_Preamble}$), the power consumption of the RX header phase ($P_{RX\_Header}$), and the power consumption of the RX data phase ($P_{RX\_Data}$) respectively with their processing time. The exact formula is set forth as follows:

$$P_{RX} = \frac{P_{RX\_Preamble} \cdot T_{RX\_Preamble} + P_{RX\_Header} \cdot T_{RX\_Header} + P_{RX\_Data} \cdot T_{RX\_Data}}{T_{RX\_Preamble} + T_{RX\_Preamble} + T_{RX\_Data}}$$

The multiple-antenna receiver 400 can divide the operation of the receiving state into the RX preamble phase, the RX header phase, and the RX data phase. Power consumption may be reduced by providing different operating processes for different phases, i.e. by moderating the respective power consumption of different receiving routes during the different receiving state.

The moderation of power consumption is applied to the receiving routes as follows:

During RX preamble phase:

All RX RFE and AFE circuits corresponding to receiving route antennas are turned on.

(2) During RX header phase:

All RX RFE and AFE circuits corresponding to receiving route antennas are turned on.

(3) During RX data phase:

Some of the RX RFE and AFE circuits corresponding to receiving route antennas are turned off if they are not considered necessary.

Figure 5:
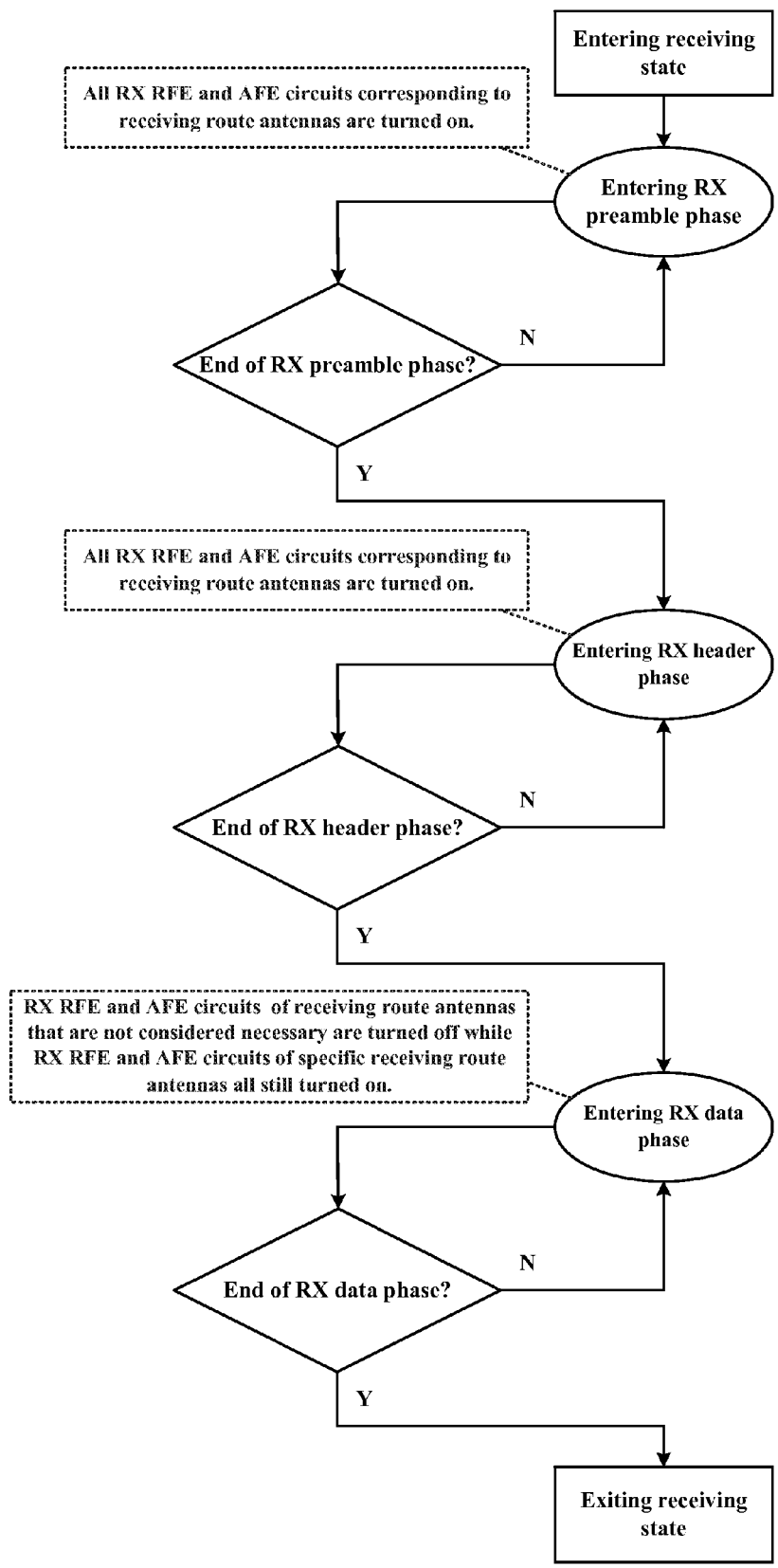
FIG. 5 illustrates a flow chart of the various states occurring in a receiving receiver of the present invention.

Detailed steps corresponding to the various phases of the receiving state of the multiple-antenna receiver 400 are depicted in a flow chart in FIG. 5. The steps are summarized as follows:

Entering RX preamble phase at the beginning of the receiving state:

All RX RFE and AFE circuits 416 corresponding to receiving route antennas are turned on. Afterwards, the AGC, carrier synchronization, timing synchronization, frame synchronization, and/or channel estimation are carried out according to the requirements. After frame synchronization is completed, the timing of further sequences to be received is thereby confirmed. As will be appreciated by persons skilled in the art, the AGC, carrier synchronization, timing synchronization, frame synchronization, and/or channel estimation can be carried out, and therefore detailed illustrations and discussions of such circuitry need not be described herein.

(2) Entering RX header phase after the RX preamble phase:

All RX RFE and AFE circuits 416 corresponding to receiving route antennas are still turned on. The header sequence goes through MIMO demodulation and decoding with the lowest level SNR requirements.

(3) Entering RX data phase after the RX header phase:

According to a predetermined scheme (to be described later in various embodiments), the RX RFE and AFE circuits 416 of receiving route antennas that are not considered necessary are turned off while RX RFE and AFE circuits 416 of specific receiving route antennas all still turned on. The data sequence is decoded by the multiple-antenna receiver 400 according to the corresponding MIMO demodulation and decoding scheme determined by the information extracted from the header sequence. As will be appreciated by persons skilled in the art, the corresponding MIMO demodulation and decoding scheme can be carried out, and therefore detailed illustrations and discussions of such circuitry need not be described herein.

(4) When the data sequence is completely received, the multiple-antenna receiver 400 exits the receiving state.

The First Method Embodiment

The RX frame controller 410 of the multiple-antenna receiver 400 can enable and disable the RX RFE and AFE circuits 416 of specific antenna receiving routes individually according to a predetermined scheme during the RX data phase, the first method embodiment using the predetermined scheme is set forth as follows:

Generate a calculated value corresponding to the signal strength of the N antenna receiving routes by means of the preamble sequence, wherein N is an integer greater than or equal to 1.

Derive the MCS (modulation and coding scheme) and the number of spatial streams, i.e. $N_{SS}$ via the information provided by the header sequence, wherein $N_{SS}$ is an integer greater than or equal to 1.

Select high and low threshold values. For example, a signal strength high threshold value, i.e. $SS_{HIGH}$ and a signal strength low threshold value, i.e. $SS_{LOW}$ according to the MCS, wherein $SS_{HIGH}$ is greater than $SS_{LOW}$.

Define $N_{BETTER}$, $N_{GOOD}$, and $N_{BAD}$:

For example, $N_{BETTER}$ is the number of receiving routes having signal strength greater than or equal to $SS_{HIGH}$, the $N_{BETTER}$ receiving routes are regarded as the receiving routes having excellent signal quality;

$N_{GOOD}$ is the number of receiving routes having signal strength in between $SS_{HIGH}$ and $SS_{LOW}$, the $N_{GOOD}$ receiving routes are regarded as the receiving routes having good signal quality;

$N_{BAD}$ is the number of receiving routes having signal strength lower than $SS_{LOW}$, the $N_{BAD}$ receiving routes are regarded as the receiving routes having bad signal quality;

wherein the sum of $N_{BETTER}$, $N_{GOOD}$, and $N_{BAD}$ equals to N.

(5) The predetermined scheme turns on specific receiving routes according to the following directions:

if $N_{BETTER}$ is greater than or equal to $N_{SS}$, a number of $N_{SS}$ receiving routes with the greatest signal strengths are chosen among the $N_{BETTER}$ receiving routes of excellent signal quality, the $N_{SS}$ receiving routes that have been chosen are turned on whereas the receiving routes that have not been chosen (a number of N minus $N_{SS}$ receiving routes) are turned off;

if $N_{BETTER}$ is less than $N_{SS}$ and the sum of $N_{BETTER}$ and $N_{GOOD}$ is greater than or equal to $N_{SS}$, the $N_{BETTER}$ receiving routes of excellent signal quality and the $N_{GOOD}$ receiving routes of good signal quality are turned on while the rest of the receiving routes, i.e. the $N_{BAD}$ receiving routes of bad signal quality are turned off;

if the sum of $N_{BETTER}$ and $N_{GOOD}$ is less than $N_{SS}$, all of the receiving routes are turned off;

wherein the signal strength of the nth (1≤n≤N) receiving route is calculated with a power calculator or a energy detector, or derived from the corresponding AGC result of the nth receiving route. As will be appreciated by persons skilled in the art, the signal strength can be calculated in a variety of ways, and therefore detailed illustrations and discussions need not be described herein.

The Second Method Embodiment

The RX frame controller 410 of the multiple-antenna receiver 400 can enable and disable the RX RFE and AFE circuits 416 of specific antenna receiving routes individually according to a predetermined scheme during the RX data phase, the second method embodiment using the predetermined scheme is set forth as follows:

Calculate the SNR of the N antenna receiving routes by means of the preamble sequence, wherein N is an integer greater than or equal to 1.

Derive the MCS and the number of spatial streams, i.e. $N_{SS}$ via the information provided by the header sequence, wherein $N_{SS}$ is an integer greater than or equal to 1.

Select a SNR high threshold value, i.e. $SNR_{HIGH}$ and a SNR low threshold value, i.e. $SNR_{LOW}$ according to the MCS, wherein $SNR_{HIGH}$ is greater than $SNR_{LOW}$.

Define $N_{BETTER}$, $N_{GOOD}$, and $N_{BAD}$:

$N_{BETTER}$ is the number of receiving routes having SNR greater than or equal to $SNR_{HIGH}$, the $N_{BETTER}$ receiving routes are regarded as the receiving routes having excellent signal quality;

$N_{GOOD}$ is the number of receiving routes having SNR in between $SNR_{HIGH}$ and $SNR_{LOW}$, the $N_{GOOD}$ receiving routes are regarded as the receiving routes having good signal quality;

$N_{BAD}$ is the number of receiving routes having SNR lower than $SNR_{LOW}$, the $N_{BAD}$ receiving routes are regarded as the receiving routes having bad signal quality;

wherein the sum of $N_{BETTER}$, $N_{GOOD}$, and $N_{BAD}$ equals to N.

(5) The predetermined scheme turns on specific receiving routes according to the following directions:

if $N_{BETTER}$ is greater than or equal to $N_{SS}$, a number of $N_{SS}$ receiving routes with the highest SNRs are chosen among the $N_{BETTER}$ receiving routes of excellent signal quality, the $N_{SS}$ receiving routes that have been chosen are turned on whereas the receiving routes that have not been chosen (a number of N minus $N_{SS}$ receiving routes) are turned off;

if $N_{BETTER}$ is less than $N_{SS}$ and the sum of $N_{BETTER}$ and $N_{GOOD}$ is greater than or equal to $N_{SS}$, the $N_{BETTER}$ receiving routes of excellent signal quality and the $N_{GOOD}$ receiving routes of good signal quality are turned on while the rest of the receiving routes, i.e. the $N_{BAD}$ receiving routes of bad signal quality are turned off;

if the sum of $N_{BETTER}$ and $N_{GOOD}$ is less than $N_{SS}$, all of the receiving routes are turned off;

wherein the SNR of the nth (1≤n≤N) receiving route, i.e. $SNR_n$ is calculated with two consecutive periodic preamble signal received from the nth receiving route according to the following formula:

$$SNR_n = \frac{1}{2} \cdot \frac{\sum_{i=0}^{L-1}(R_{n,L+i} + R_{n,i})^2}{\sum_{i=0}^{L-1}(R_{n,L+i} - R_{n,i})^2},$$

wherein L is the period of the periodic signal in the preamble sequence, and $R_{n,k}$ is the kth signal (0≤k<2L) in two consecutive periodic preamble signal received from the nth receiving route. As will be appreciated by persons skilled in the art, the SNR can be calculated in a variety of ways, and therefore detailed illustrations and discussions need not be described herein.

The Third Method Embodiment

The RX frame controller 410 of the multiple-antenna receiver 400 can enable and disable the RX RFE and AFE circuits 416 of specific antenna receiving routes individually according to a predetermined scheme during the RX data phase, the third method embodiment using the predetermined scheme is set forth as follows:

Calculate the delay spread of the N antenna receiving routes by means of the preamble sequence, wherein N is an integer greater than or equal to 1.

Derive the MCS and the number of spatial streams, i.e. $N_{SS}$ via the information provided by the header sequence, wherein $N_{SS}$ is an integer greater than or equal to 1.

Select a delay spread high threshold value, i.e. $TD_{LONG}$ and a delay spread low threshold value, i.e. $TD_{SHORT}$ according to the MCS, wherein $TD_{LONG}$ is greater than $TD_{SHORT}$.

Define $N_{BETTER}$, $N_{GOOD}$, and $N_{BAD}$:

$N_{BETTER}$ is the number of receiving routes having delay spread shorter than or equal to $TD_{SHORT}$, the $N_{BETTER}$ receiving routes are regarded as the receiving routes having excellent signal quality;

$N_{GOOD}$ is the number of receiving routes having delay spread in between $TD_{LONG}$ and $TD_{SHORT}$, the $N_{GOOD}$ receiving routes are regarded as the receiving routes having good signal quality;

$N_{BAD}$ is the number of receiving routes having delay spread longer than $TD_{LONG}$, the $N_{BAD}$ receiving routes are regarded as the receiving routes having bad signal quality;

wherein the sum of $N_{BETTER}$, $N_{GOOD}$, and $N_{BAD}$ equals to N.

(5) The predetermined scheme turns on specific receiving routes according to the following directions:

if $N_{BETTER}$ is greater than or equal to $N_{SS}$, a number of $N_{SS}$ receiving routes with the shortest delay spreads are chosen among the $N_{BETTER}$ receiving routes of excellent signal quality, the $N_{SS}$ receiving routes that have been chosen are turned on whereas the receiving routes that have not been chosen (a number of N minus $N_{SS}$ receiving routes) are turned off;

if $N_{BETTER}$ is less than $N_{SS}$ and the sum of $N_{BETTER}$ and $N_{GOOD}$ is greater than or equal to $N_{SS}$, the $N_{BETTER}$ receiving routes of excellent signal quality and the $N_{GOOD}$ receiving routes of good signal quality are turned on while the rest of the receiving routes, i.e. the $N_{BAD}$ receiving routes of bad signal quality are turned off;

if the sum of $N_{BETTER}$ and $N_{GOOD}$ is less than $N_{SS}$, all of the receiving routes are turned off;

wherein the longest and root mean square delay spread $TD_n$ of the nth ($1 \le n \le N$) receiving route is estimated with the output of a preamble sequence matched filter as represented respectively in the following formulas:

$$TD_n = \operatorname{argmax}_k \{|M_{n,k}| \ge TH_{MF}\} \text{ (longest delay spread)},$$

$$TD_n = \sqrt{\frac{\sum_{k=0}^{L-1} k^2 \cdot |M_{n,k}|}{\sum_{k=0}^{L-1} |M_{n,k}|}} \text{ (root mean square delay spread)},$$

wherein $M_{n,k}$ is the kth output signal ($0 \le k < L$) of the preamble sequence matched filter of the nth receiving route, and $TH_{MF}$ is a threshold value. As will be appreciated by persons skilled in the art, the delay spread of the receiving routes can be calculated in a variety of ways, and therefore detailed illustrations and discussions need not be described herein.

The Fourth Method Embodiment

The RX frame controller 410 of the multiple-antenna receiver 400 can enable and disable the RX RFE and AFE circuits 416 of specific antenna receiving routes individually according to a predetermined scheme during the RX data phase, the fourth method embodiment using the predetermined scheme is set forth as follows:

Calculate the envelop level crossing rate of the N antenna receiving routes by means of the preamble sequence, wherein N is an integer greater than or equal to 1.

Derive the MCS and the number of spatial streams, i.e. $N_{SS}$ via the information provided by the header sequence, wherein $N_{SS}$ is an integer greater than or equal to 1.

Select a envelop level crossing rate high threshold value, i.e. $LCR_{HIGH}$ and a envelop level crossing rate low threshold value, i.e. $LCR_{LOW}$ according to the MCS, wherein $LCR_{HIGH}$ is greater than $LCR_{LOW}$.

Define $N_{BETTER}$, $N_{GOOD}$, and $N_{BAD}$:

$N_{BETTER}$ is the number of receiving routes having envelop level crossing rate less than or equal to $LCR_{LOW}$, the $N_{BETTER}$ receiving routes are regarded as the receiving routes having excellent signal quality;

$N_{GOOD}$ is the number of receiving routes having envelop level crossing rate in between $LCR_{HIGH}$ and $LCR_{LOW}$, the $N_{GOOD}$ receiving routes are regarded as the receiving routes having good signal quality;

$N_{BAD}$ is the number of receiving routes having envelop level crossing rate greater than $LCR_{HIGH}$, the $N_{BAD}$ receiving routes are regarded as the receiving routes having bad signal quality;

wherein the sum of $N_{BETTER}$, $N_{GOOD}$, and $N_{BAD}$ equals to N.

(5) The predetermined scheme turns on specific receiving routes according to the following directions:

if $N_{BETTER}$ is greater than or equal to $N_{SS}$, a number of $N_{SS}$ receiving routes with the lowest envelop level crossing rates are chosen among the $N_{BETTER}$ receiving routes of excellent signal quality, the $N_{SS}$ receiving routes that have been chosen are turned on whereas the receiving routes that have not been chosen (a number of N minus $N_{SS}$ receiving routes) are turned off;

if $N_{BETTER}$ is less than $N_{SS}$ and the sum of $N_{BETTER}$ and $N_{GOOD}$ is greater than or equal to $N_{SS}$, the $N_{BETTER}$ receiving routes of excellent signal quality and the $N_{GOOD}$ receiving routes of good signal quality are turned on while the rest of the receiving routes, i.e. the $N_{BAD}$ receiving routes of bad signal quality are turned off;

if the sum of $N_{BETTER}$ and $N_{GOOD}$ is less than $N_{SS}$, all of the receiving routes are turned off;

wherein the envelope level crossing rate of the nth ($1 \le n \le N$) receiving route is calculated according to long term statistical results of preamble sequence amplitude variations in consecutive packets received, or according to Doppler shift estimation because of the proportional relationship between the envelop level crossing rate and the Doppler shift estimation results.

The Fifth Method Embodiment

The RX frame controller 410 of the multiple-antenna receiver 400 can enable and disable the RX RFE and AFE circuits 416 of specific antenna receiving routes individually according to a predetermined scheme during the RX data phase, the fifth method embodiment using the predetermined scheme is set forth as follows:

Calculate the frequency domain level crossing rate of the N antenna receiving routes by means of the preamble sequence, wherein N is an integer greater than or equal to 1.

Derive the MCS and the number of spatial streams, i.e. $N_{SS}$ via the information provided by the header sequence, wherein $N_{SS}$ is an integer greater than or equal to 1.

Select a frequency domain level crossing rate high threshold value, i.e. $FLCR_{HIGH}$ and a frequency domain level crossing rate low threshold value, i.e. $FLCR_{LOW}$ according to the MCS, wherein $FLCR_{HIGH}$ is greater than $FLCR_{LOW}$.

Define $N_{BETTER}$, $N_{GOOD}$, and $N_{BAD}$:

$N_{BETTER}$ is the number of receiving routes having frequency domain level crossing rate less than or equal to $FLCR_{LOW}$, the $N_{BETTER}$ receiving routes are regarded as the receiving routes having excellent signal quality;

$N_{GOOD}$ is the number of receiving routes having frequency domain level crossing rate in between $FLCR_{HIGH}$ and $FLCR_{LOW}$, the $N_{GOOD}$ receiving routes are regarded as the receiving routes having good signal quality;

$N_{BAD}$ is the number of receiving routes having frequency domain level crossing rate greater than $FLCR_{HIGH}$, the $N_{BAD}$ receiving routes are regarded as the receiving routes having bad signal quality;

wherein the sum of $N_{BETTER}$, $N_{GOOD}$, and $N_{BAD}$ equals to N.

(5) The predetermined scheme turns on specific receiving routes according to the following directions:

if $N_{BETTER}$ is greater than or equal to $N_{SS}$, a number of $N_{SS}$ receiving routes with the lowest frequency domain level crossing rates are chosen among the $N_{BETTER}$ receiving routes of excellent signal quality, the $N_{SS}$ receiving routes that have been chosen are turned on whereas the receiving routes that have not been chosen (a number of N minus $N_{SS}$ receiving routes) are turned off;

if $N_{BETTER}$ is less than $N_{SS}$ and the sum of $N_{BETTER}$ and $N_{GOOD}$ is greater than or equal to $N_{SS}$, the $N_{BETTER}$ receiving routes of excellent signal quality and the $N_{GOOD}$ receiving routes of good signal quality are turned on while the rest of the receiving routes, i.e. the $N_{BAD}$ receiving routes of bad signal quality are turned off;

if the sum of $N_{BETTER}$ and $N_{GOOD}$ is less than $N_{SS}$, all of the receiving routes are turned off;

wherein the frequency-domain level crossing rate of the nth (1≤n≤N) receiving route is calculated according to a periodic preamble signal with FFT (Fast Fourier Transform) as represented in the following formula:

$$FLCR_n = \frac{N_{CSI\_HIGH}}{N_{FFT}},$$

wherein $N_{FFT}$ is the number of points used in FFT and $N_{CSI\_HIGH}$ is the number of points that may be:

the absolute value of the FFT result that is greater than or equal to a specific threshold, or the absolute value of the squared FFT result that is greater than or equal to a specific threshold.

The Sixth Method Embodiment

The RX frame controller 410 of the multiple-antenna receiver 400 can enable and disable the RX RFE and AFE circuits 416 of specific antenna receiving routes individually according to a predetermined scheme during the RX data phase, the sixth method embodiment using the predetermined scheme is set forth as follows:

Calculate the signal quality index of the N antenna receiving routes by means of the preamble sequence, wherein N is an integer greater than or equal to 1.

Derive the MCS and the number of spatial streams, i.e. $N_{SS}$ via the information provided by the header sequence, wherein $N_{SS}$ an integer is greater than or equal to 1.

Select at least two threshold values regarding signal quality indices according to the MCS, wherein:

if the indications of the signal quality indices include signal strength, then select a signal strength high threshold value, i.e. $SS_{HIGH}$ and a signal strength low threshold value, i.e. $SS_{LOW}$, wherein $SS_{HIGH}$ is greater than $SS_{LOW}$;

if the indications of the signal quality indices include SNR, then select a SNR high threshold value, i.e. $SNR_{HIGH}$ and a SNR low threshold value, i.e. $SNR_{LOW}$, wherein $SNR_{HIGH}$ is greater than $SNR_{LOW}$;

if the indications of the signal quality indices include delay spread, then select a delay spread high threshold value, i.e. $TD_{LONG}$ and a delay spread low threshold value, i.e. $TD_{SHORT}$, wherein $TD_{LONG}$ is greater than $TD_{SHORT}$;

if the indications of the signal quality indices include envelop level crossing rate, then select a envelop level crossing rate high threshold value, i.e. $LCR_{HIGH}$ and a envelop level crossing rate low threshold value, i.e. $LCR_{LOW}$, wherein $LCR_{HIGH}$ is greater than $LCR_{LOW}$;

if the indications of the signal quality indices include frequency-domain level crossing rate, then select a frequency-domain level crossing rate high threshold value, i.e. $FLCR_{HIGH}$ and a frequency-domain level crossing rate low threshold value, i.e. $FLCR_{LOW}$, wherein $FLCR_{HIGH}$ is greater than $FLCR_{LOW}$;

Define $N_{BETTER}$, $N_{GOOD}$ and $N_{BAD}$:

$N_{BETTER}$ is the number of receiving routes with excellent signal quality complying with the following restrictions:

if the indications of the signal quality indices include signal strength, then the signal strength should be greater than or equal to $SS_{HIGH}$;

if the indications of the signal quality indices include SNR, then the SNR should be greater than or equal to $SNR_{HIGH}$;

if the indications of the signal quality indices include delay spread, then the delay spread should be shorter than or equal to $TD_{SHORT}$;

if the indications of the signal quality indices include envelop level crossing rate, then the envelop level crossing rate should be less than or equal to $LCR_{LOW}$;

if the indications of the signal quality indices include frequency-domain level crossing rate, then the frequency-domain level crossing rate should be less than or equal to $FLCR_{LOW}$;

$N_{GOOD}$ is the number of receiving routes with good signal quality complying with the following requirements:

if the indications of the signal quality indices include signal strength, then the signal strength should be greater than or equal to $SS_{LOW}$;

if the indications of the signal quality indices include SNR, then the SNR should be greater than or equal to $SNR_{LOW}$;

if the indications of the signal quality indices include delay spread, then the delay spread should be shorter than or equal to $TD_{LONG}$;

if the indications of the signal quality indices include envelop level crossing rate, then the envelop level crossing rate should be less than or equal to $LCR_{HIGH}$;

if the indications of the signal quality indices include frequency-domain level crossing rate, then the frequency-domain level crossing rate should be less than or equal to $FLCR_{HIGH}$;

if there are any other receiving routes with good signal quality, they should also be included;

$N_{BAD}$ is the number of receiving routes with bad signal quality, which fails to meet the requirements of $N_{BETTER}$ and $N_{GOOD}$;

wherein the sum of $N_{BETTER}$, $N_{GOOD}$, and $N_{BAD}$ equals to N.

(5) The predetermined scheme turns on specific receiving routes according to the following directions:

if $N_{BETTER}$ is greater than or equal to $N_{SS}$, a number of $N_{SS}$ receiving routes with the better signal quality indices are chosen among the $N_{BETTER}$ receiving routes of excellent signal quality, the $N_{SS}$ receiving routes that have been chosen are turned on whereas the receiving routes that have not been chosen (a number of N minus $N_{SS}$ receiving routes) are turned off;

if $N_{BETTER}$ is less than $N_{SS}$ and the sum of $N_{BETTER}$ and $N_{GOOD}$ is greater than or equal to $N_{SS}$, the $N_{BETTER}$ receiving routes of excellent signal quality and the $N_{GOOD}$ receiving routes of good signal quality are turned on while the rest of the receiving routes, i.e. the $N_{BAD}$ receiving routes of bad signal quality are turned off;

if the sum of $N_{BETTER}$ and $N_{GOOD}$ is less than $N_{SS}$, all of the receiving routes are turned off;

wherein the signal quality index of the nth ($1 \le n \le N$) receiving route can be derived from the signal strength, SNR, time delay, envelope level crossing rate, or frequency-domain level crossing rate as mentioned in the foregoing passages regarding the first to the fifth method embodiments. As will be appreciated by persons skilled in the art, a variety of signal quality index can be used in the invention, and therefore detailed illustrations and discussions need not be described herein.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for receiving a data frame with a multiple-antenna apparatus, said data frame comprising a non-data sequence and a data sequence, said method comprising the steps of:
    entering a state for receiving said non-data sequence and turning on N receiving routes to receive said non-data sequence of said data frame, wherein said non-data sequence comprises a preamble sequence and a header sequence;
    determining first and second information based on said non-data sequence;
    selecting plural threshold levels for said first information according to said second information;
    defining said N receiver routes according to different quality levels based on said first information and said plural threshold levels; and
    entering a state for receiving said data sequence and turning on M of said N receiving routes to receive said data sequence of said data frame, wherein M is less than N, wherein said turning on of M receiving routes is based on said defined receiver routes and said second information, wherein M is an integer greater than or equal to 1.

2. The method as claimed in claim 1, wherein M is determined by a signal quality index of said non-data sequence.

3. The method as claimed in claim 2, wherein said signal quality index refers to at least one of signal intensity, signal-to-noise ratio, delay spread, envelope level crossing rate, and frequency-domain level crossing rate.

4. The method as claimed in claim 2, wherein M is determined by a signal quality index of a preamble sequence of said non-data sequence.

5. The method as claimed in claim 1, wherein M is determined according to the distribution of N signal quality indices relative to at least one threshold level.

6. The method as claimed in claim 5, wherein said signal quality indices correspond to said N receiving routes.

7. The method as claimed in claim 5, wherein the at least one threshold level corresponds to a data sequence modulation and coding scheme of the multiple-antenna apparatus.

8. The method as claimed in claim 5, wherein the at least one threshold level comprises a first threshold level and a second threshold level.

9. An apparatus for receiving a data frame comprising a non-data sequence and a data sequence, said apparatus comprising:
    N receiving routes, wherein each of the N receiving routes comprises radio frequency and analog front-end circuits coupled to a respective antenna;
    wherein, in a first state, said N receiving routes are turned on to receive said non-data sequence of said data frame, wherein said non-data sequence comprises a preamble sequence and a header sequence; and
    wherein, in a second state, M of said N receiving routes are turned on to receive said data sequence of said data frame, and N-M of said N receiving routes are turned off, wherein M is less than N, wherein M is determined by a signal quality index of said preamble sequence, wherein M is determined according to the distribution of a plurality of N said signal quality indices relative to at least one threshold level, wherein M is an integer greater than or equal to 1.

10. The apparatus of claim 9, wherein said signal quality index refers to at least one of signal intensity, signal-to-noise ratio, delay spread, envelope level crossing rate, and frequency-domain level crossing rate.

11. The apparatus of claim 9, wherein the signal quality indices correspond to said N receiving routes.

12. The apparatus of claim 9, wherein the at least one threshold level corresponds to a data sequence modulation and coding scheme of the apparatus.

13. The apparatus of claim 9, wherein the at least one threshold level comprises a first threshold level and a second threshold level.

14. The apparatus of claim 9, wherein M is determined by a plurality of signal quality indices of said non-data sequence.

15. The apparatus of claim 9, wherein M is determined according to a data sequence modulation and coding scheme of the apparatus.

16. The apparatus of claim 9, wherein the apparatus further comprises a frame controller configured to individually control the radio frequency and analog front-end circuits.

* * * * *